July 29, 1969　　　FUSANORI NAKAJIMA　　　3,458,149

FILM SPOOL

Filed Nov. 2, 1967

INVENTOR
FUSANORI NAKAJIMA
BY
Kane, Dalsimer, Kane, Sullivan & Smith
ATTORNEYS

United States Patent Office 3,458,149
Patented July 29, 1969

3,458,149
FILM SPOOL
Fusanori Nakajima, 527 Brook St.,
Mamaroneck, N.Y. 10543
Filed Nov. 2, 1967, Ser. No. 680,084
Int. Cl. B65h 17/02
U.S. Cl. 242—68.4                                5 Claims

ABSTRACT OF THE DISCLOSURE

A film spool having a socket at each end thereof and which is adapted to be mounted in a camera having axially aligned studs, one of which is axially movable. The juncture of each socket with the end face of the spool is bevelled to form a conical surface at the entrance to the socket to facilitate its positioning in and removal from the camera.

Background and summary of the invention

This invention relates to an improved film spool for use in a conventional roll-film camera.

It is the general practice of film manufacturers to place roll film on a spool which is adapted to be mounted on a pair of supporting studs in the camera. The spool is initially mounted on such studs at a feed position in the camera and the film is fed across the lens to a similarly mounted take-up spool. When all of the film has been exposed and positioned on the take-up spool, the latter spool is removed for processing and the original feed spool is transferred to the take-up position. The camera is then ready to receive a new roll of film.

It is seen that during each film change, four spool positioning operations are required. First, the exposed film spool is removed from the take-up position, then the empty spool is removed from the feed position and placed in the take-up position, and finally the new film roll is positioned in the feed position. These operations are troublesome since the end sockets in the spool must be accurately positioned onto the two supporting studs, and the dimensions between the receiving portion of the camera and spool are minimal. They are especially difficult when attempted in the field, since the camera must usually be supported by hand. Also, the problem is prevalent with professional cameras since such cameras are heavy and bulky, and the film studs are often positioned in a difficult location.

The solution to this problem has not been forthcoming since the dimensions of both the spool and the supporting structure in the camera are closely controlled by recognized manufacturing standards. Thus, a complete redesign of the equipment with a view toward facilitating the positioning and removal operations has not been possible.

In a broad sense this invention relates to a spool for use as a film feed or take-up device in a camera having a cylindrical body, a flange disposed at each end of the body, and a stud receiving socket in each end of the body, the juncture of said sockets with the end faces of the body being bevelled.

It is an object of the present invention to provide a film spool which may be easily positioned in or removed from a camera. It is a further object to provide a spool which complies with the recognized dimensional tolerances and which may be utilized with the film and cameras of present design.

These and other objects and advantages of the present invention will become apparent from the following detailed description.

Description of the preferred embodiment

Figure 1:
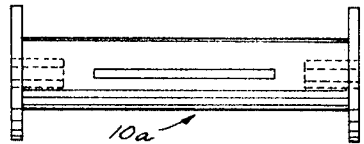
FIG. 1 is a plan and end view of a film spool of conventional design.
Figure 3:
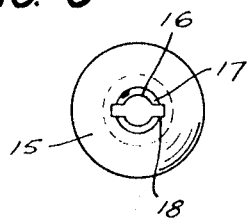
FIG. 3 is an end view of the spool of FIG. 2.
Figure 2:
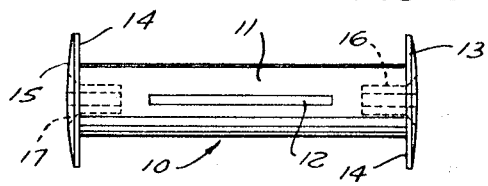
FIG. 2 is a plan view of the spool of the present invention.

The spool of the instant invention is generally designated at 10 in the drawings. A spool of the type presently in use is designated at 10a in FIG. 1.

The spool 10 includes a cylindrical body portion 11 upon which the film is rolled in the conventional manner. The body 11 includes a horizontal slot 12 which is designed to receive and retain the end of the film roll. A flange 13 is positioned at each end of the body and is designed to preclude the lateral shifting of the film. The opposing end faces formed by the flange 13 which are adjacent the body 11 form generally parallel planar surfaces 14. However, in one embodiment of the invention the opposite end faces 15 are of a spheroidal configuration for the purposes hereinafter set forth. Each end of the cylindrical body includes a socket 16 formed along the axis thereof. The juncture of the sockets 16 with the end face 15 is bevelled at 17 to form a conical entrance to the socket. Also, a key slot 18 is positioned in the socket at least at one end of the body to effect the rotation of the spool when it is mounted in the camera.

In all conventional roll film cameras, the spool having the unexposed film is mounted in the camera at a feed position, from which the film is sequentially fed across the lens to a take-up position. The structure of the spool supporting means in the camera at the feed position and take-up position is generally similar and is indicated at 20 in FIG. 4. The spool 10 is mounted between two axially aligned studs 21 and 22 which are designed to be received by the sockets 16 of the spool. The stud 22 is axially retractable to the position shown by the dotted lines in the drawing to permit entry of the spool in the manner indicated. With the stud 22 retracted, the spool aperture 16 at the opposite end is first positioned on the stud 21, the spool is then lowered to its proper position, and the stud 22 advanced to its original position to lock the spool in place. The stud 21 at the take-up position has a key 23 to be received in the slot 18 of the spool, the key 23 being rotatable by a conventional mechanism (not shown) to rotate the spool and thereby advance the film.

As will be readily appreciated, the clearance between the spool 10 and its supporting structure is necessarily minimal in order to insure the accurate alignment of the film across the lens. This lack of clearance makes it difficult to grip the spool during the positioning and removal operations. It is an important feature of this invention to provide a bevel 17 at the juncture of the socket 16 with the outer end face 15 of the spool to facilitate these operations.

Figure 4:
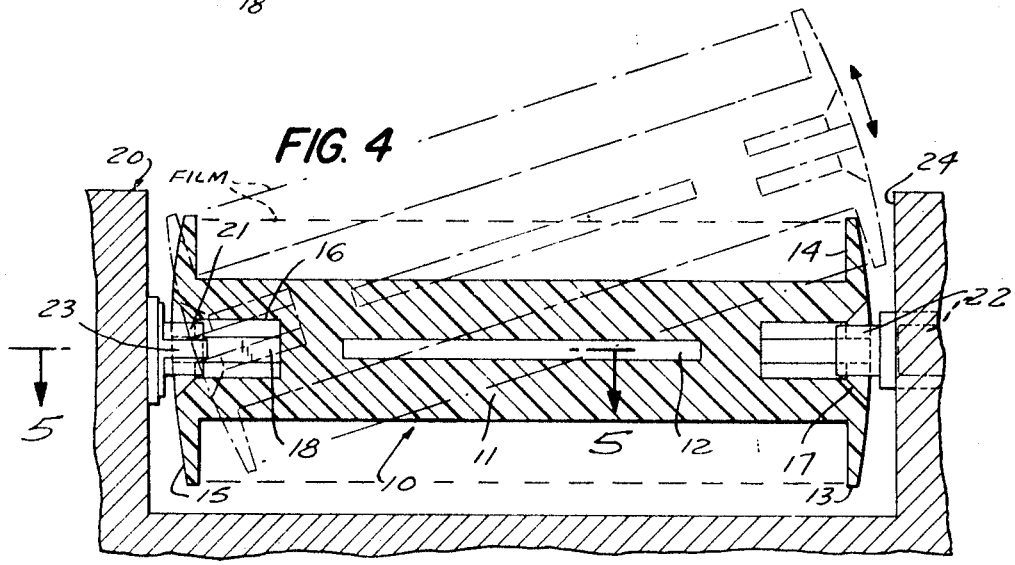
FIG. 4 is a horizontal sectional view of the spool of this invention positioned on the mounting studs of a camera.

During the positioning of a spool of present design, the socket 16 must be exactly aligned with the end of the stud 21 when the spool is in the tilted position as shown in FIG. 4. Also, the spool must necessarily be positioned closely adjacent to the wall 24 of the camera to permit the stud to enter the socket. The use of the bevel 17 not only serves to guide the stud into the socket, but also increases the allowable clearance and permits the spool to be positioned while at a greater distance from the wall 24. This added clearance makes it easier to grip the spool with the fingers and thereby control its alignment in relation to the stud.

Figure 5:
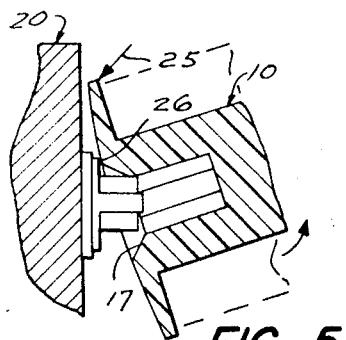
FIGS. 5 and 6 are views similar to FIG. 4 illustrating the manner in which the spool is removed from the camera.
Figure 6:
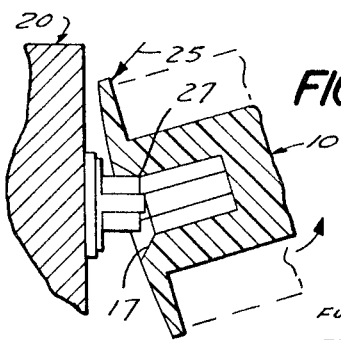

The removal of a spool of present design is especially troublesome since the lack of clearance at the ends and along the sides makes it nearly impossible to grip the spool with the fingers. However, the spool of the present invention is easily removed from the camera in a completely novel manner as illustrated in FIGURES 5 and 6. If a finger is pressed to the flange 13 such that a force is exerted in the direction of arrow 25, it has been found that the spool will freely rotate in the direction indicated and will literally "pop out" of the camera.

The mechanics of the "pop out" feature are shown in FIGURES 5 and 6. It will be noted that when the stud 22 is in its retracted position, there is a certain amount of axial play between the spool and wall 24. If the spool should happen to be positioned toward the left as shown in FIGURE 5, the force exerted along arrow 25 will cause the spool to pivot at point 26, the bevel 17 furnishing the necessary clearance to permit rotation. If the spool is positioned toward the right as shown in FIGURE 6, the pivot will occur at point 27 on the bevel 17, the contact between the beveled surface and stud resulting in a camming action which facilitates the rotation of the spool. Thus, in either case, the provision of the bevel 17 is essential to the "pop out" feature. With spools of present design, the contact and binding between the walls of the socket 16 and the stud precludes the necessary free rotation to effect removal.

A bevel of almost any size or angle will produce beneficial results. However, for purposes of example only, it has been found that if the outer diameter of the bevel is approximately 50% greater than the diameter of the socket, and if the bevel is disposed at an angle of approximately 45° to the axis of the spool, very effective results are obtained.

The spheroidal shape of the end faces 15 also facilitates the positioning and removal operations by providing an extra clearance between the outer circumference of the flange 13 and wall 24 of the camera without sacrificing the axial extent of the engagement between the stud and socket. This added clearance is important in providing an extra degree of axial freedom of the spool during the insertion and removal operations as will be apparent from the illustration of the tilted spool in FIG. 4. The added clearance at the outer periphery of the flange also facilitates the gripping of the spool by one's fingernails should this be required.

The spool 10 may be made from any suitable synthetic organic material. It is preferred to mold the spool from the low cost plastic material of the type presently being used for conventional spools.

While this invention is described by reference to a preferred embodiment thereof, it is not intended to be limited thereto except insofar as the appended claims are so limited, since modifications coming within the scope of the invention will readily suggest themselves to one skilled in the art.

I claim:
1. In a camera adapted to receive spool mounted film, the combination comprising,
   a supporting structure in the camera including a pair of oppositely directed axially aligned studs disposed in spaced relation,
   and a molded plastic spool adapted to be mounted between said studs having a cylindrical body portion, a flange at each end thereof, and an axially extending socket entering each end of said body and being adapted to receive said studs, the juncture of said sockets with the end faces of said body being bevelled to form a conical surface at the entrance to said socket to facilitate its positioning in and removal from said camera.

2. In a camera as defined in claim 1, wherein one of said studs is axially movable.

3. In a camera as defined in claim 2, wherein the end faces are of generally spheroidal configuration.

4. A molded plastic spool for use as a film feeding or take-up device in a camera comprising,
   a cylindrical body,
   a flange disposed at each end of said body to form an end face thereon,
   an axially extending socket in the body at each end thereof, the juncture of said sockets with said end faces being bevelled to form a conical surface at the entrance to said socket to facilitate its positioning in and removal from a camera.

5. A spool as defined in claim 4, wherein said end faces of said body are of generally spheroidal configuration.

References Cited

UNITED STATES PATENTS

| | | | |
|---|---|---|---|
| 1,063,980 | 6/1913 | La Joie | 242—68.4 |
| 1,402,167 | 1/1922 | Kingsbury | 242—71 |
| 1,528,128 | 3/1925 | Peterson | 242—71.8 |
| 1,654,725 | 1/1928 | Eriksen | 242—71 |

NATHAN L. MINTZ, Primary Examiner